United States Patent
Wu

(10) Patent No.: US 7,027,721 B1
(45) Date of Patent: Apr. 11, 2006

(54) TEMPERATURE-RATED VARIABLE SPEED CONTROL CIRCUIT OF AN ELECTRIC FAN

(76) Inventor: Chin-Ping Wu, No. 32, Lane 5, Zihyou St., Pingjhen City, Taoyuan County (TW)

( * ) Notice: Subject to any disclaimer, the term of this patent is extended or adjusted under 35 U.S.C. 154(b) by 87 days.

(21) Appl. No.: 10/719,139

(22) Filed: Nov. 24, 2003

(51) Int. Cl.
    *H02P 5/00* (2006.01)

(52) U.S. Cl. .............. 388/800; 388/821; 388/934; 318/461; 318/471; 318/432

(58) Field of Classification Search .......... 388/800, 388/815, 821–823, 934; 318/461, 471, 472, 318/432, 434
See application file for complete search history.

(56) References Cited

U.S. PATENT DOCUMENTS

| | | | |
|---|---|---|---|
| 4,656,553 A * | 4/1987 | Brown | 361/31 |
| 4,856,078 A * | 8/1989 | Konopka | 388/831 |
| 6,023,402 A * | 2/2000 | Kaminski | 361/103 |
| 6,396,231 B1 * | 5/2002 | Horng et al. | 318/471 |
| 6,396,238 B1 * | 5/2002 | Miyahara | 318/807 |

* cited by examiner

*Primary Examiner*—Rina Duda
(74) *Attorney, Agent, or Firm*—Egbert Law Offices

(57) ABSTRACT

An electric fan temperature-rated variable speed control circuit, includes a D.C. current source and fan activation IC. There are, between the current source positive and negative poles serially connected transistor, regulation tube, with the regulation tube negative pole linked to the current source negative pole, and its positive pole, incorporated to form the primary current. Between triode base and collector lies a serially connected resistor. The triode collector is linked to the current source positive pole, and between its base and collector lies a serially connected rectifying resistor, which bypasses through the base to connect with the fan activation IC for sending out fan rotation speed control signals with which to form a circuit that adopts a straightforward, easy-to-implement method that offers low-cost and dependable temperature-control characteristics.

3 Claims, 2 Drawing Sheets

TEMPERATURE-RATED VARIABLE SPEED CONTROL CIRCUIT OF AN ELECTRIC FAN

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention pertains to a preferred embodiment of a type of D.C., brushless electric fan temperature-rated speed control circuit, particularly of an electric fan-specific temperature-rated control circuit of innovative configuration.

BACKGROUND OF THE INVENTION

Insomuch that most of the common temperature-rated D.C. electric fans that exist in the marketplace have largely been fitted with integrated circuit components as the temperature control circuit, and some of the widely used temperature-control components are none other tan model LB 1860, 8473 and the like, which are of pulse-rated fabrication technique that not only do not offer a dependable temperature control effect but can produce excessive electromagnetic noise at low cycles, not to mention that such condense circuit components are expensive in cost, not readily available for purchase to lead to a cost hike and an extended production cycle. In addition, there is also a type of temperature-rated electric fan out on the market that incorporates a thermal-resistor structure at the current source, if not for the fact that such circuit thermal-resistor consumes excessive power and can be tricky in temperature control due to unpredictable temperature curves.

Through which, issues that relate addressing some of the shortcomings of the foregoing common temperature-rated D.C. electric fan, such as a less than dependable temperature control function, excessive electromagnetic noise at low cycles, costly component price in fabrication, source of goods at purchasing, availability in purchasing, which only lead to cost increase and extended production cycle, have presented themselves as a compelling area for the industry to look into improvement and R&D in terms of devising an innovative fan-specific temperature-rated variable speed control circuit that truly works.

BRIEF SUMMARY OF THE INVENTION

A key technical issue that needs to be resolved primarily lies in how best to address issues surrounding the conventional D.C. electric fan having a less than perfected temperature control feature and excessive electromagnetic noise at low cycles.

The core technical focus on the problems to be resolved rests on a fan-specific temperature-rated variable speed control circuit, which is comprised of D.C. current source and fan activation IC, whose characteristics lie in that between the current positive and negative poles are serially connected resistor L1, regulation tube DZ, where the negative pole of the regulation tube DZ is connected to the current negative pole to form a primary voltage, when paired with the positive pole. While the positive pole of said voltage stabilizer diode DZ bypasses through the thermal-resistor Rtr to link to the triode Q1 base, and between said triode Q1 base and the collector lies a serially connected resistor R2, which has its collector linked to the current negative pole, and its receptor is bypassing through resistor R3 to link to the triode Q2 negative pole to form a second base voltage for the triode Q2. The collector of said triode Q2 is linked to the current source positive pole, and between its transmitter and bases lies serially connected attenuator resistor R4, which bypasses through the bases to send out fan rotation speed control signals toward the fan activation IC. Through the foregoing technique, between the fan activation IC signal output ports 2 and 3 and the triode Q2 base can be incorporated with serially connected coil resistances L2 and L1, where said voltage stabilizer DZ stabilized current can be set to 5.1 Volts, and the thermal-resistor Rtr can be of a negative temperature-rated thermal-resistor.

Through which, the invention incorporates commonly used electronic components by incorporating triodes (Q1, Q2), resistors (R1, R2, R3, R4), regulation tube DZ, together with temperature-rated thermal-resistor Rtr to form an open amplifying circuit, and by incorporating variable impedance-rated coil resistances (L1, L2), with which to realize the objective of controlling the fan activation IC and automatically adjusting the fan rotation speed according to temperature changes. The proposed practical new model, when compared with the existing technology, offers straightforward circuit, and is easy to implement, and offers advantages of a temperature control effect that is comparable to the temperature control effect using thermal integrated circuit component yet generates less electromagnetic noise than the conventional integrated circuit components, let along it also helps to greatly reduce the cost.

A comparison to the function yield offered by prior art:

The invention incorporates commonly used electronic components by incorporating triodes (Q1, Q2), resistors (R1, R2, R3, R4), regulation tube DZ, together with temperature-rated thermal-resistor Rtr to form an open amplifying circuit, and by incorporating variable impedance-rated coil resistances (L1, L2), with which to realize the objective of controlling the fan activation IC and automatically adjusting the fan rotation speed according to temperature changes. The proposed practical new model, when compared with the existing technology, offers a simplistic circuit, and is easy to implement, and offers advantages of a temperature control effect that is comparable to the temperature control effect using a thermal integrated circuit component yet generates less electromagnetic noise than the conventional integrated circuit components, let along it also helps to greatly reduce the cost.

DETAILED DESCRIPTION OF THE INVENTION

Figure 1:
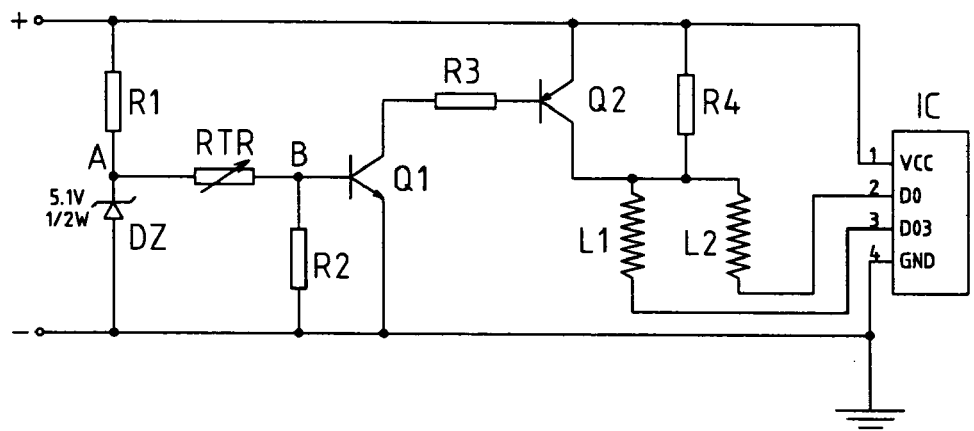
FIG. 1 shows a circuitry schematics view of the electrical fan air-volume speed-control circuit as proposed by the invention.

To facilitate the review council in gaining further understanding and knowledge of the invention objective, characteristics and function yield, please refer to the simplified description of illustrations in conjunction with the following detailed description, To begin, please refer to what is shown in FIG. 1 that pertains to a preferred implement of the invention fan temperature-rated variable speed-control circuit, which is comprised of D.C. current and fan activation IC, and line between the current positive and negative poles are resistor R1 and voltage stabilizer rated at 5.1 V of a voltage stabilizer diode DZ, with the negative pole of said voltage stabilizer diode DZ linked to the current source negative pole to form a primary current when paired with the positive pole; the positive pole of said voltage stabilizer diode DZ is bypassing through the negative temperature-rated thermal-resistor Rtr to link to the triode Q1 base, and between triode Q1 base and grounding lies serially connected resistor R2. The collector of said triode Q1 is linked to the current source negative pole, and its base is bypassing resistor R3 to link to the triode Q2 base to form a secondary primary current to the triode Q2. The collector of said triode Q2 is linked to the current source positive pole, and between its collector and base lies serially connected attenuator resistor R4, which bypasses through the base to send off fan rotation speed control signals toward the fan activation IC.

In support of the consumer variety needs in fan speed adjustment, at the triode Q2 base and the fan activation IC two fan rotation speed control signal input ports 2 and 3 are separately fitted with serially connected two coil resistances L2 and L1, through which varied rotation speeds can be obtained by altering the impedance ratings of the coil resistances; of which, said fan activation IC can be filled by a wide range of commonly used trigger components on models such as the 276, 277, 9141, 1668 and the like.

Below provides a detailed account on the inventory working theory,

Given that R1 and DZ regulate point A with a 5.1V primary current, meaning the primary primary current, point B current can be derived from:

$$Vb = VA \times RT/R2 + RTR = 5.1 \times R2/R2 + RTR$$

Where when Vb>0.7V, the triode Q1 works at a saturated area and bypasses the triode Q1 base and resistor R3 to offer triode Q2 base with a secondary primary current, which sends the triode Q2 to work in the saturated area, where its saturated voltage drop VCES is at between 0.2V~0.3V. At this point, the attenuator resistor R4 is stripped of passing current and the fan is at its maximum rotation cycle. While as the negative temperature-rated thermal-resistor Rtr, which drops alongside the temperature as the temperature rises and the impedance rating diminishes, and when the Rtr impedance rating increases, the VB reduces regulating the Q2 to work at the cutoff zone, hence sending the current to pass through resistor R4. As R4 intervenes the circuit to cause the fan to operate at the lowest rotation speed, the Rtr impedance rating, which reacts to temperature changes, causing the triode Q2 to work in the aggregated area would then cause the fan rotation speed to alter along the changes that occurred in the thermal-resistor Rtr impedance ratings.

Figure 2:
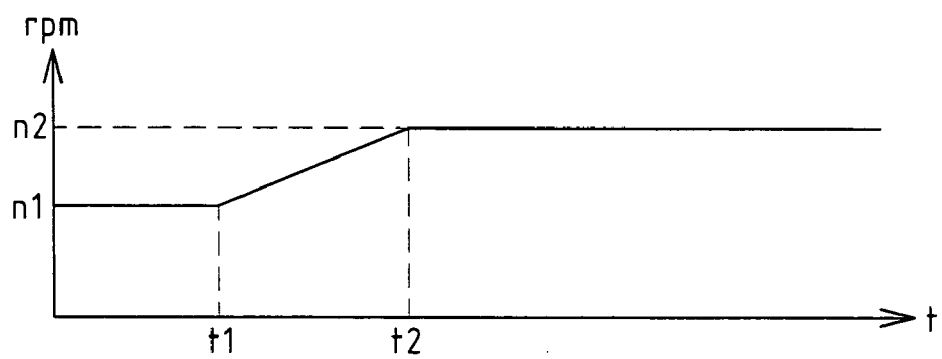
FIG. 2 shows a graphic illustration showing a temperature curve view of the electric fan air-volume speed-control circuit as proposed by the invention.
Figure 3:
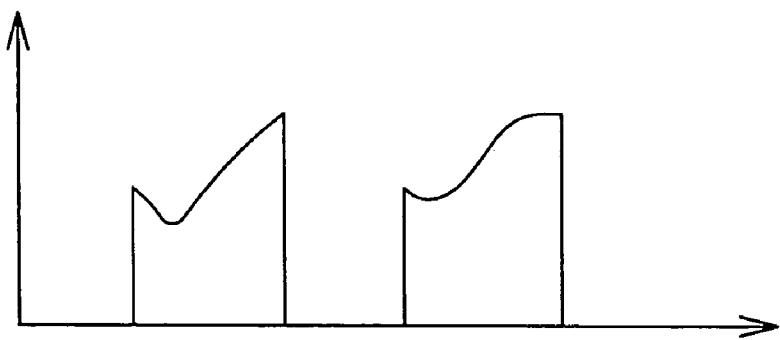
FIG. 3 shows an oscillogram view of the temperature-rated D.C. electric fans structure of the prior art.
Figure 4:
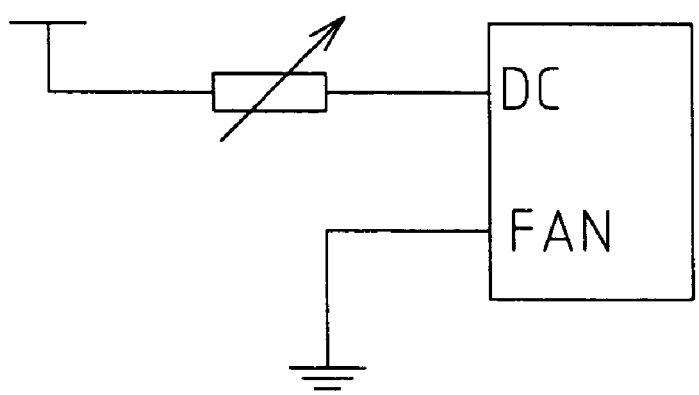
FIG. 4 shows a circuitry schematics view of the temperature-rated electric fans incorporates a thermal-sensitive resistor structure of the prior art.

As shown in FIG. 2, it depicts the invention temperature curve, where the horizontal coordinate represents the temperature and the vertical coordinate the fan rotation speed. Where when the temperature should fall below t1, the fan rotation speed is set to a constant of n1; while when the temperature rises above t2, the fan rotation speed reverts to a constant n2; while when the temperature falls between t1 and t2, the fan rotation speed would fluctuate between n1 and n2.

In addition, the proposed practical new model thermal-resistor can also be substituted with an adjustable resistor that supports the consumer manual adjustment feature.

Facts pertaining to the invention functional yield are as follows:

The practical innovative model incorporates commonly used electronic components by incorporating triodes (Q1, Q2), resistors (R1, R2, R3, R4), regulation tube DZ, together with temperature-rated thermal-resistor Rtr to form an open amplifying circuit, and by incorporating variable impedance-rated coil resistances (L1, L2), with which to realize the objective of controlling the fan activation IC and automatically adjusting the fan rotation speed according to temperature changes. The proposed practical new model, when compared with the existing technology, offers a straightforward circuit, and is easy to implement, and offers advantages of a temperature control effect that is comparable to the temperature control effect using thermal integrated circuit component yet generates less electromagnetic noise than that of the conventional integrated circuit components, let along it also helps to greatly reduce the cost.

I claim:

1. A variable speed central circuit for use with an electric fan comprising:
    a fan activation IC;
    a DC current source having positive and negative power supply terminals;
    a first resistor;
    a diode connected in series with said first resistor between said positive and negative power supply terminals of said current source; a first triode having a base and a collector and an emitter; a thermal resistor connected to said diode and said base of said first triode;
    a second resistor connected between said base and said collector of said first triode; a second triode having a base and a collector and an emitter;
    a third resistor, said emitter of said first triode being connected to said negative power supply terminal, said collector of said first triode being connected to said third resistor and connected to said base of said second triode; and
    a fourth resistor connected between said emitter and said collector of said second triode so as to send speed signals to said fan activation IC.

2. The circuit of claim 1, said diode being rated at 5.1 volts.

3. The circuit of claim 1, said thermal resistor being a negative temperature thermal resistor.

* * * * *